United States Patent

Bashkansky et al.

[11] Patent Number: 5,293,403
[45] Date of Patent: Mar. 8, 1994

[54] PULSE DISCHARGE LASER WITH PASSIVE ARC PROTECTION

[75] Inventors: Mark Bashkansky, Alexandria; Bernard L. Wexler, Arlington, both of Va.

[73] Assignee: The Unites States of America as represented by the Secretary of the Navy, Washington, D.C.

[21] Appl. No.: 953,605

[22] Filed: Sep. 30, 1992

[51] Int. Cl.$^5$ .............................................. H01S 3/097
[52] U.S. Cl. ...................................... 372/87; 372/25; 372/57; 372/86; 372/109
[58] Field of Search ................. 372/25, 38, 30, 55, 372/57, 58, 73, 86, 87, 92, 96, 98, 108, 109, 70

[56] References Cited

U.S. PATENT DOCUMENTS

| | | | |
|---|---|---|---|
| 3,940,710 | 2/1976 | Lemay | 331/94.5 |
| 4,041,414 | 8/1977 | Richardson et al. | 372/86 X |
| 4,088,965 | 5/1978 | Lauderslager et al. | 372/57 X |
| 4,115,828 | 9/1978 | Rowe et al. | 361/1 |
| 4,259,646 | 3/1981 | Sze et al. | 372/57 X |
| 4,330,762 | 5/1982 | Kaye et al. | 372/85 |
| 4,481,630 | 11/1984 | Box et al. | 372/38 |
| 4,555,787 | 11/1985 | Cohn et al. | 372/87 X |
| 4,613,971 | 9/1986 | Brumme et al. | 372/87 |
| 4,630,277 | 12/1986 | Cirkel et al. | 372/38 |
| 4,635,267 | 1/1987 | Cirkel et al. | 372/38 |
| 4,663,568 | 5/1987 | Cohn | 315/163 |
| 4,748,635 | 5/1988 | McLellan | 372/86 X |
| 4,802,185 | 1/1989 | Kyusho | 372/86 |
| 5,027,366 | 6/1991 | Akins et al. | 372/87 X |
| 5,048,045 | 9/1991 | Noda et al. | 372/38 X |
| 5,050,178 | 9/1991 | Brückner et al. | 372/87 X |
| 5,070,513 | 12/1991 | Letardi | 372/87 X |
| 5,247,534 | 9/1993 | Muller-Horsche | 372/87 X |
| 5,251,226 | 10/1993 | Watanabe et al. | 372/87 |

FOREIGN PATENT DOCUMENTS 2234109  1/1991  United Kingdom ............. 372/87 X

OTHER PUBLICATIONS

"A Simple Technique to Prevent Misfire Arcing in Discharge-Pumped Excimer Lasers", M. Bashkansky, B. L. Wexler, Rev. Sci. Instrum., 63(2), Feb. 1992, pp. 1838-1839.
"Large Scale Discharge-Pumped Excimer Laser Research at NRL", B. L. Wexler, L. F. Champagne, SPIE vol. 709-Laser Research and Development in the Northeast, 1986, pp. 3-10.
"Further Studies of Large Aperture XeCl Discharge Laser Performance", B. L. Wexler, R. L. Burnham, Excimer Lasers-1983, AIP Conference Proceedings, OSA, Lake Tahoe, Nev., 1983, pp. 52-58.

Primary Examiner—Brian Healy
Attorney, Agent, or Firm—George Jameson; Thomas E. McDonnell

[57] ABSTRACT

A pulse discharge laser is provided having a pair of electrodes disposed within a laser chamber pressurized with a high-pressure gas. A preionizer generator intermittently produces preionization energy to preionize the high pressure gas in the laser chamber. A pulse forming network intermittently supplies a ramping voltage to the pair of electrodes. When the high pressure gas in the laser chamber is not properly preionized by the preionization energy a damaging arc may occur and lasing will not occur by discharge of the ramping voltage on the electrodes. A passive electrode arc protector is provided connected across the pair of laser electrodes to discharge the ramping voltage across the electrodes when the high pressure gas is not properly preionized to protect the laser electrodes from a damaging arc between them.

16 Claims, 5 Drawing Sheets

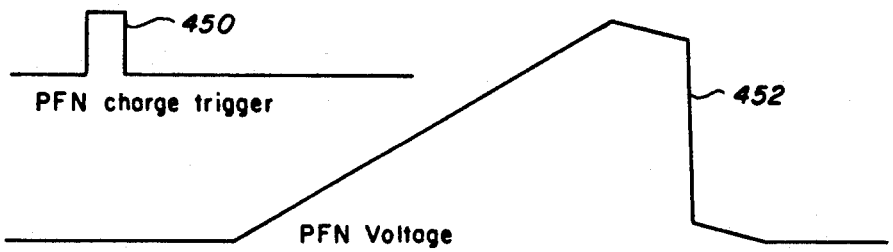
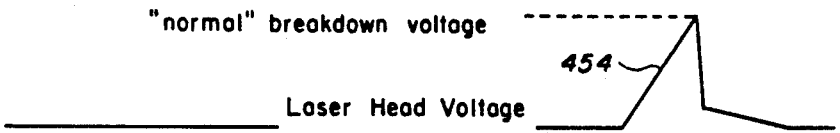
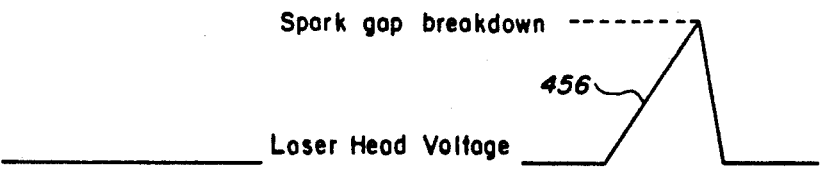
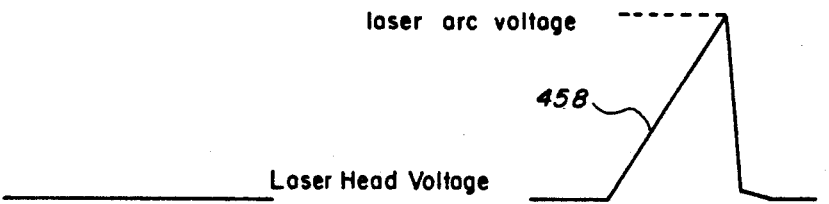
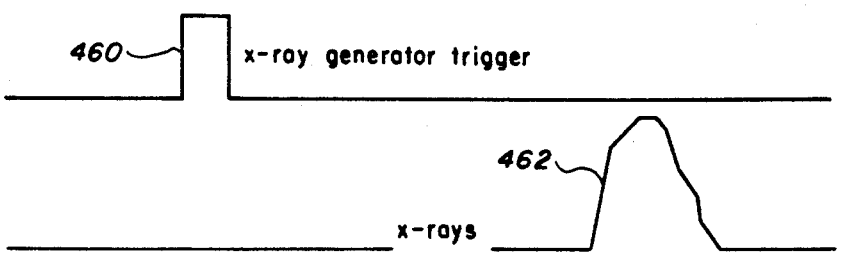
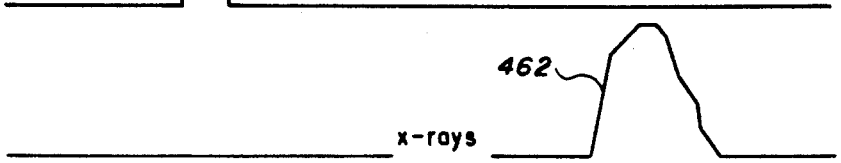

PULSE DISCHARGE LASER WITH PASSIVE ARC PROTECTION

BACKGROUND OF THE INVENTION

1. Field of the Invention

The present invention relates to a pulse discharge laser with a passive element to prevent damaging arcs between laser electrodes, and particularly relates to a pulse discharge laser having a passive electrode arc protector to prevent arcing between laser electrodes due to improper preionization of a high pressure gas between the laser electrodes.

2. Description of the Related Art

FIG. 1 illustrates a prior art pulse discharge laser having a high pressure gas within a chamber 110. Electrodes 120 and 130 are contained within the chamber 110. X-rays are radiated into the chamber 110 to provide preionization energy to preionize the high pressure gas in the chamber 110. The x-rays are emitted from an x-ray generator 140 disposed adjacent to the chamber 110. A pulse generator 150 and a delay circuit 160 command the x-ray generator 140 to generate the x-rays after a power supply 170 is commanded to begin applying power to a water line capacitor 180. The water line capacitor 180 increases its charge voltage by the energy applied from the power supply 170 while the gas in the chamber 110 becomes preionized by the x-rays emitted from the x-ray generator 140. Preionization refers to the creation of a uniform electron density of at least $10^6$ electrons per centimeter cubed ($cm^3$) in the discharge region prior to the application of the main discharge used for pumping the laser. When the voltage on the water line capacitor 180 reaches a predetermined voltage, the charge on the water line capacitor 180 passes through a rail gap switch 190 and appears across the electrodes 120 and 130. After the voltage on the water line capacitor 180 is applied to the electrodes 120 and 130, discharge occurs between the electrodes. Assuming the high pressure gas in the chamber 110 is properly preionized by the x- rays emitted from the x-ray generator 140, the voltage on the electrodes 120 and 130 uniformly discharges through the preionized gas between an entirety of the surfaces of electrodes 120 and 130, thus causing pulsed lasing to occur in the high pressure gas.

However, the high pressure gas in the chamber 110 is not always properly preionized when the voltage is applied across the electrodes 120 and 130. Sometimes proper preionization will not occur because of a timing error in the control signals received by the x-ray generator 140 and the power supply 170. Other times the high pressure gas will not be properly preionized when the x-ray generator 140 fails or has an intermittent delay. When proper preionization does not occur, the voltage arcs across the electrodes 120 and 130 and can cause severe damage to the laser. These arcs are particularly damaging inside of the chamber 110 where they can damage the surfaces of the electrodes 120 and 130. The metal electrodes 120 and 130 are typically plated with a second metal, and halides of the metal surface can form as a result of the arcing. These halides form a suspended dust in the optical path and deposit on window openings in the chamber 110. Arcing can also pit the plating on the electrodes 120 and 130, exposing the metal underneath to attack by the halogen gas in the chamber and causing halide dusts. Additionally, the arcing can cause impurities in the high pressure gas.

Prevention of arcing is discussed in U.S. Pat. No. 4,115,828 issued to Rowe et al. In the Rowe et al. Patent, an arc is detected in a continuous wave gas laser by sensing the voltage between electrodes in the laser. Upon sensing a voltage at which arcing occurs, a power supply to the electrodes is disconnected. Rowe et al. take about 5 to 10 milliseconds to shut down the power supply to the continuous wave gas laser. However, the technique employed by Rowe et al. is not fast enough for a pulse discharge laser because a pulse discharge laser requires response times of about 10 nanoseconds. Furthermore, the sensing circuit of Rowe et al. is subject to failure and difficult to adapt to different types of laser gasses.

SUMMARY OF THE INVENTION

It is an object of the present invention to provide a pulse discharge laser having electrode arc protection.

It is another object of the present invention to provide a pulse discharge laser having high speed arc discharge protection against arcing between electrodes of a high pressure gas laser.

It is still another object of the present invention to provide a pulse discharge laser with a simple arc discharge protection device exhibiting high reliability due to simple construction.

Another object of the present invention is to provide a pulse discharge laser having a passive device for protection from arcing.

Still another object of the present invention is to provide a pulse discharge laser having an easily adjustable arc protector.

A pulse discharge laser with protection from arcing due to lack of proper preionization is provided by the present invention. A high pressure gas and a laser chamber having a pair of electrodes disposed therein is preionized by preionization energy produced from a preionizer generator. A pulse forming network intermittently supplies a ramping voltage to the pair of electrodes. If the high pressure gas is not properly preionized, the ramping voltage will not cause lasing by discharge through the high pressure gas but, rather, the ramping voltage will continue to increase until it reaches an over-voltage fault condition and is discharged by a passive electrode arc protector.

The above-mentioned and other objects and features of the present invention will become apparent from the following description when read in conjunction with the accompanying drawings.

BRIEF DESCRIPTION OF THE DRAWINGS

FIGS. 3(*a*) through 3(*g*) illustrate timing diagrams of the pulse discharge laser of the present invention;

DETAILED DESCRIPTION OF THE PREFERRED EMBODIMENTS

Figure 1:
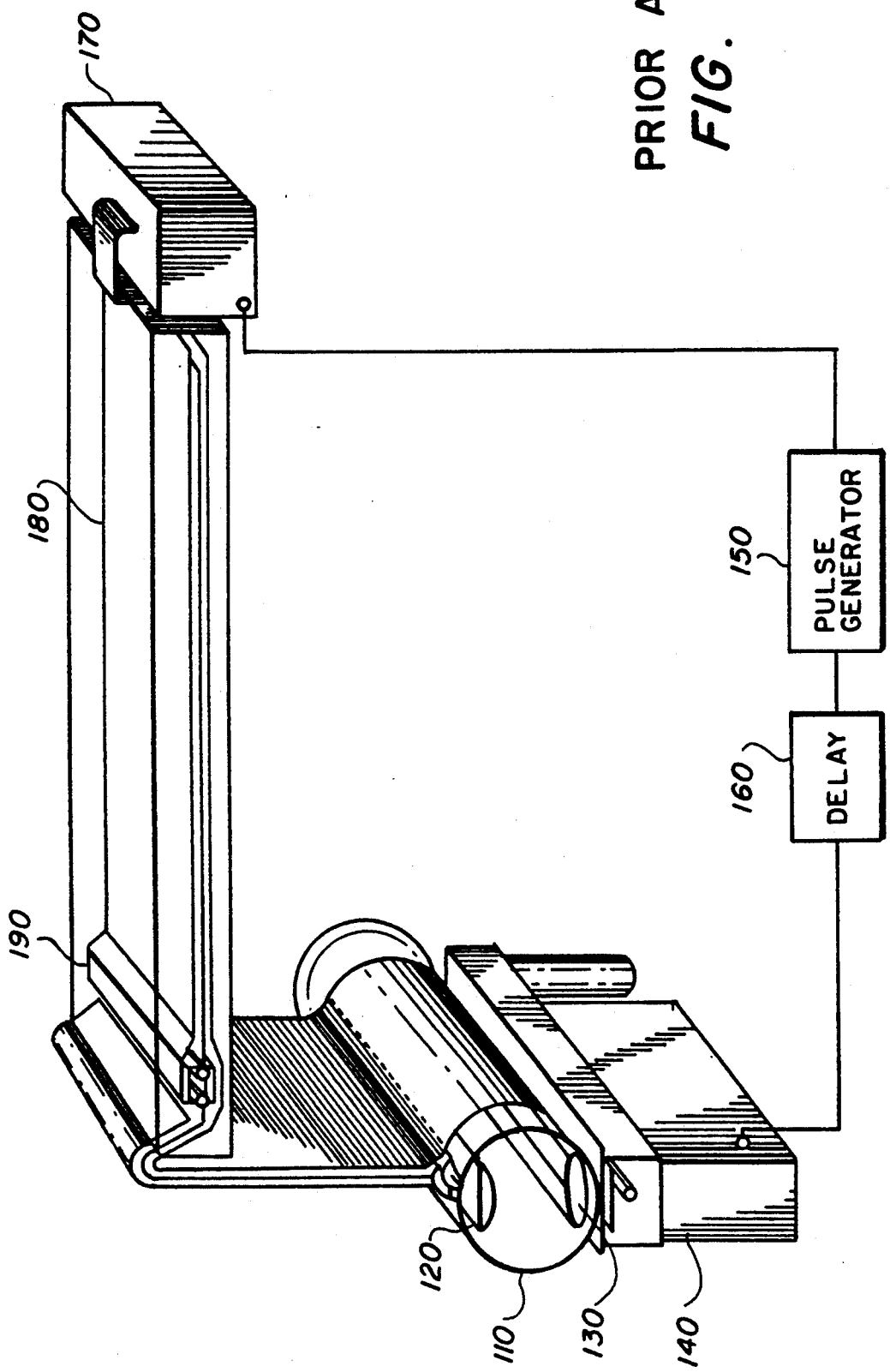
FIG. 1 illustrates a perspective view of a schematic diagram of a pulse discharge laser of the prior art.
Figure 2:
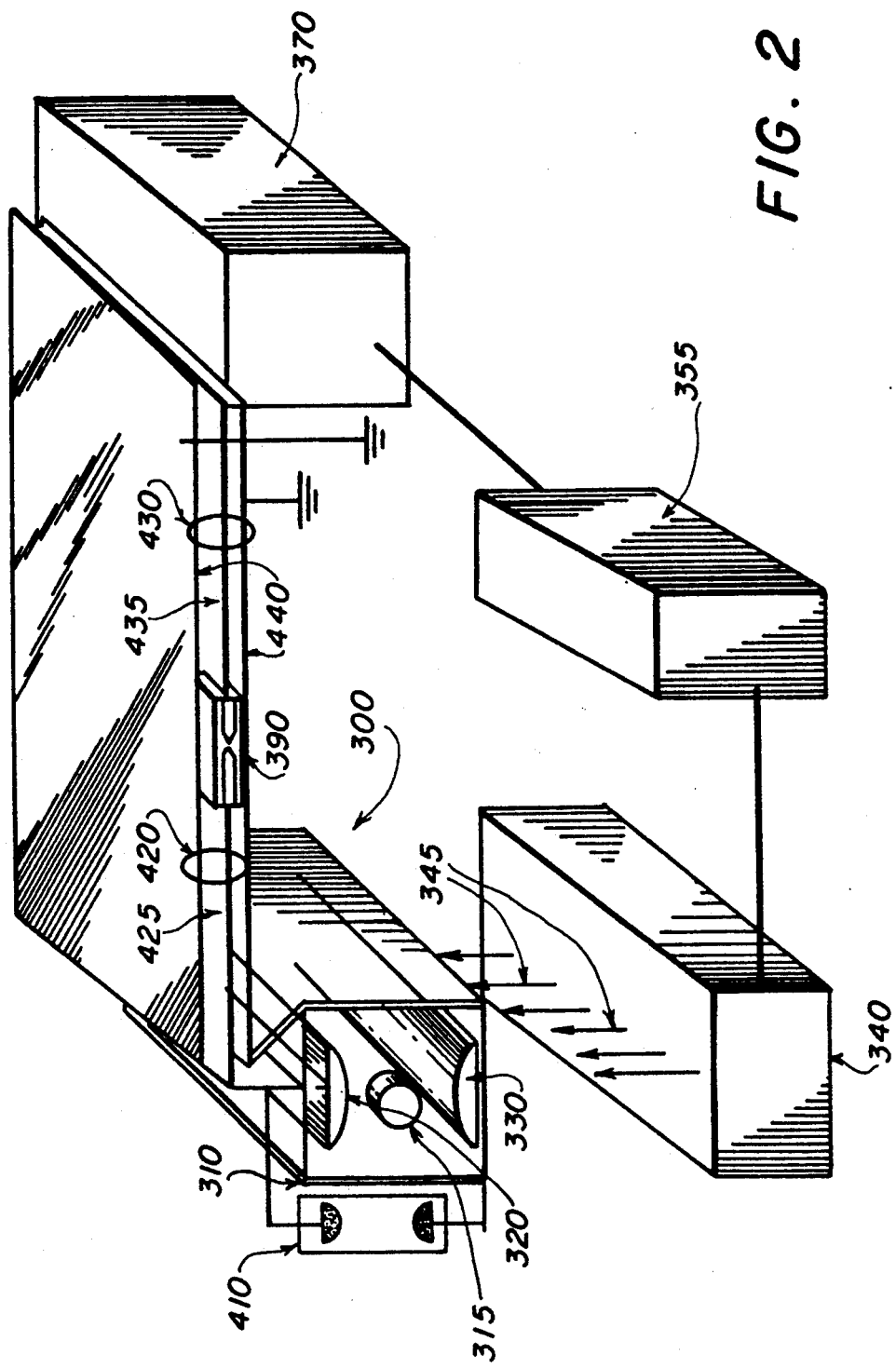
FIG. 2 illustrates a perspective schematic diagram of a first embodiment of the arc-protected pulse discharge laser of the present invention.

FIG. 2 illustrates a pulse discharge laser of a first embodiment of the present invention. A laser head 300 consisting of a chamber 310 having electrodes or laser head electrodes 320 and 330 is filled with a high pressure gas mixture well known in the art to create excimers, such as XeCl, XeF, KrF, ArF or any other high pressure gas capable of forming a high pressure gas pulse laser or an excimer laser. A window 315 is provided in an optical path of the chamber 310. However, the window 315 does not need to be a mirror because light amplification in a laser can occur without reflection within a cavity such as, for example, in an optical amplifier.

A passive electrode arc protector 410 is electrically connected to the electrodes 320 and 330 to protect from electrode arcing. Preferrably, the electrode arc protector 410 is connected directly across the laser electrodes 320 and 330 to ensure minimum impedance difference between the arc protector circuit and the laser electrodes. However, under certain circumstances the arc protector may be located elsewhere, as will be described below.

An intermittently ramping voltage is applied across the electrodes 320 and 330 from a pulse forming network (PFN) 370. The pulse forming network 370 generates the ramping voltage to the electrodes 320 and 330 via transmission lines 420 and 430 and via switch 390. Transmission lines 420 and 430 consist of center conductors 425 and 435, respectively, and outer conductors 440. Center conductors 425 and 435 are serially connected to opposite sides of switch 390.

The switch 390 can be either a rail gap switch or a magnetic switch. The rail gap switch or magnetic switch 390 applies the ramping voltage from the pulse forming network 370 to the electrodes 320 and 330 when the voltage reaches a predetermined voltage level. Typically, the rail gap switch 390 is provided by a spark gap which allows current to jump the gap and flow when the voltage exceeds a predetermined voltage level. However, the switch 390 can also be a triggered rail gap or a magnetic switch such as a saturable inductor of a type which can provide controlled switching.

The pulse forming network 370 contains a power supply and an array of capacitors to store the charge of the ramping voltage. Alternatively, a portion of the transmission line 430 can be provided with a water line to form the capacitor. A water line uses merely water as a dielectric of the capacitor for separating two metal plates to hold the charge. Pulse forming networks having either internal capacitors or a water line can be constructed as described by B. L. Wexler et al. in "Large Scale Discharge-Pumped Excimer Laser Research at NRL", *SPIE Vol. 709-Laser Research and Development in the Northeast*, Society of Photo-optical Instrumentation Engineers, 1986, pp. 3-10 which is incorporated herein by reference and B. L. Wexler et al., "Further Studies of Large Aperture XeCl Discharge Laser Performance", *Excimer Lasers*-1983, *AIP Conference Proceedings*, OSA, Lake Tahoe, Nev., 1983, pp. 52-58, which is also incorporated herein by reference.

An x-ray generator 340 for providing preionization energy 345 in the form of x-rays to preionize the high pressure gas in the chamber 310 is also illustrated in FIG. 2. Besides x-rays, the high pressure gas can also be preionized by preionization energy such as electron beams or ultraviolet radiation. Additional details were published by M. Bashkansky and B. L. Wexler which are incorporated herein by reference to "A Simple Technique to Prevent Misfire Arcing in Discharged-Pumped Excimer Lasers", *Rev. Sci. Instrum.* 63 (2), February 1992, pp. 1838–1839.

The x-ray generator 340 and the pulse forming network 370 are controlled by a control circuit 355 as will be described below in conjunction with FIGS. 3(a) through 3(g). Furthermore, how the passive electrode arc protector 410 operates to discharge the electrodes 320 and 330 is also explained with reference to FIGS. 3(a) through 3(g).

FIGS. 3(a) through 3(g) illustrate waveforms of operating parameters during operation of the pulse discharge laser illustrated in FIG. 2. FIG. 3(a) illustrates a pulse forming network (PFN) charge trigger 450 outputted from the control circuit 355 to the pulse forming network 370. FIG. 3(f) illustrates an x-ray generator trigger 460 outputted from the control circuit 355 to the x-ray generator 340. The PFN charge trigger 450 illustrated in FIG. 3(a) causes the pulse forming network 370 to generate the pulse forming network (PFN) voltage 452 illustrated in FIG. 3(b). The PFN voltage 452 rises while the capacitor (not shown) associated with the pulse forming network 370 charges.

The relative timing between the x-ray generator trigger 460 and the PFN charge trigger 450 generated by controller 355 depends on the inherent delay between the x-ray generator trigger 460 and the actual production of x-rays 462 as respectively shown in FIGS. 3 (f) and 3(g), and the inherent delay between the PFN charge trigger 450 and the appearance of the rising laser head voltage 454 across the laser head as respectively shown in FIGS. 3(a) and 3(c). Since the x-rays 462 must provide preionization during the voltage increase across the laser electrodes 320 and 330, the relative timing between the two triggers 454 and 462 must be adjusted for this to occur as shown in FIGS. 3 (c) and 3(g). Should the x-rays 462 not be present to provide preionization during the rising laser head voltage 458 shown in FIG. 3(e) across the electrodes, either due to a malfunction in the timing circuit, the x-ray generator 340, or the PFN 370 or rail switch 390 which changes the timing sequence, or in the x-ray generator 340 which results in no x-rays, arcing can occur between the electrodes 320 and 330. The tolerance in the timing between the x-rays 462 and the laser head voltage depends upon the width and intensity of the x-ray pulse 462, the rise time of the laser head voltage across the electrodes 320 and 330, and the laser mixture, and may be as short as ten nanoseconds.

The normal operation of the laser will be described with reference to FIG. 3(c) and two fault conditions will be described with reference to FIGS. 3(d) and FIG. 3(e). FIGS. 3(c) through 3(e) illustrate the laser head voltage which is the voltage between the electrodes 320 and 330. When the PFN voltage 452 of FIG. 3(b) reaches the predetermined voltage level selectable by the switch 390, the PFN voltage 452 will be applied to the electrodes 320 and 330. When the switch 390 causes the voltage to be applied to the electrodes 320 and 330, the PFN voltage 452 of FIG. 3(b) will begin to decrease while the laser head voltage 454 illustrated in FIG. 3(c) will increase. Assuming proper preionization of the high pressure gas in the laser, this laser head voltage of FIG. 3(c) will increase until it reaches the "normal"

breakdown voltage of the properly preionized gas. When the "normal" breakdown voltage is reached, all of the charge stored in the capacitor associated with the pulse forming network 370 will begin to flow between the electrodes 320 and 330 causing the laser head voltage 454 of FIG. 3(c) and the PFN voltage 452 of FIG. 3(b) to rapidly drop as illustrated. A large current thus discharges from the capacitance (not shown) in the pulse forming network 370 and flows uniformly through the properly preionized gas to cause a lasing pulse. Thereafter the cycles illustrated in FIGS. 3(a)-3(c), 3(f) and 3(g) repeat according to the pulse repetition frequency desired of the laser. Repeated pulsed lasing thus occurs by the repeated pulsed discharge of this laser.

FIG. 3(d) illustrates the change in the laser head voltage 456 during the protection provided by the passive electrode arc protector 410, and FIG. 3(e) illustrates the laser head voltage 458 during arcing without the passive electrode arc protector 410. If the high pressure gas in the chamber 310 is not properly preionized, for example, because of incorrect timing between the x-ray generator trigger 460 and the PFN charge trigger 450 of FIGS. 3(a) and 3(f), or because of intermittent delay drift in the x-ray generator 340 or the pulse forming network 370, or due to failure of the x-ray generator 340, the "normal" breakdown will not occur, as described above with reference to FIG. 3(c). Instead, the laser head voltage will continue to rise past the point of "normal" breakdown. Without the passive electrode arc protector 410, as illustrated in FIG. 3(e), the laser head voltage 458 will continue to rise until reaching the laser arc voltage. When the laser head voltage 458 reaches the laser arc voltage, as illustrated in FIG. 3(e), arcing will occur between the electrodes 320 and 330 causing damage such as pitting of the electrodes or soiling of the gas as previously discussed.

Because of the very short time between the appearance of the x-rays and the proper or improper discharge of the laser, it is generally not possible to "sense" the lack of x-rays or preionization and prevent the voltage from reaching the arc breakdown point. Such a sensor, logic circuit, trigger generator, and triggered switch combination to determine the lack of appropriate preionization and "short out" the voltage at the laser head would be complex, susceptible to failure, and too slow to be successful and reliable. Because of the inherent delay between the trigger and the appearance of the rising voltage, it is not at all possible to make the triggering of the PFN or even the rail switch 390 dependent upon the proper appearance of the preionization.

It was discovered that an opportunity was present in the range between the "normal" breakdown voltage and the laser arc voltage, respectively illustrated in FIGS. 3(c) and 3(e), to prevent this damaging arcing. It was discovered that the passive electrode arc protector 410 was capable of switching within this narrow range of voltages and during this short segment of time. When the passive electrode arc protector 410 was connected between the electrodes 320 and 330, as shown in FIG. 2, and adjusted for arc protection at a switching voltage in the range between the "normal" breakdown voltage shown in FIG. 3(c) and the laser arc voltage shown in FIG. 3(e), this damaging arcing condition was prevented, as illustrated in FIG. 3(d), by the passive electrode arc protector 410.

As illustrated by the waveform 456 of FIG. 3(d), the passive electrode arc protector 410 discharges when the laser head voltage reaches a switching voltage between the laser arc voltage (FIG. 3(e)) and the "normal" breakdown voltage (FIG. 3(c)). The passive electrode arc protector 410 contains discharge contacts spaced from one another by a distance sufficient to cause discharge precisely at the switching voltage between the laser head voltage and the "normal" breakdown voltage. Therefore, when lasing does not occur from "normal" breakdown, the charge in the capacitor can be discharged before the laser head voltage reaches the laser arc voltage, thus preventing damage to the components of the laser. The passive electrode arc protector 410 is simple, reliable, and functions "automatically".

Figure 4:
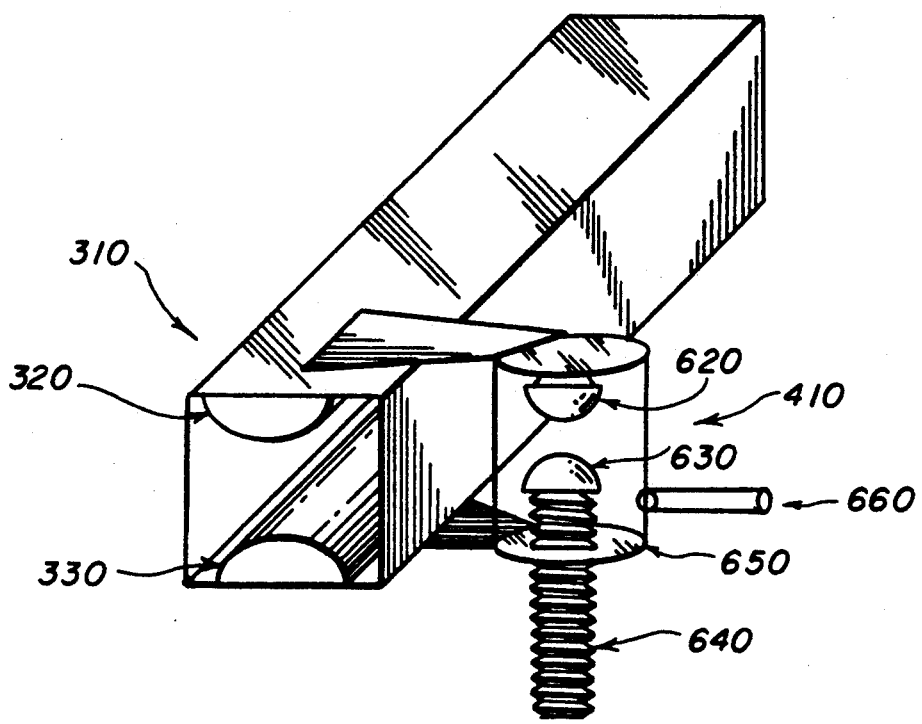
FIG. 4 illustrates a detailed diagram of the arc protector of FIG. 2.

FIG. 4 illustrates a detailed diagram of the arc protector of FIG. 2. Laser discharge electrodes 320 and 330 are provided within a chamber 310. In the case of the embodiment of FIG. 2, in which x-rays pass through one of the laser electrodes 320 and 330, the electrode must be aluminum to allow high transmission of the x-rays. The aluminum must be protected from contact with halogen gas by a thin nickel coating. A passive electrode arc protector 410 is provided connected across the electrodes 320 and 330. The passive electrode arc protector 410 contains discharge contacts 620 and 630 which are adjustably spaced, for example, by a screw-adjustment mechanism 640. The discharge contacts 620 and 630 are preferably enclosed by a gas filled enclosure 650. The pressure of gas in the gas filled enclosure 650 can be adjusted through a gas inlet port 660.

The switching voltage of the passive electrode arc protector 410 can be adjusted by either varying the spacing between the discharge contacts 620 and 630 or by changing the pressure of the gas applied to the gas filled enclosure 650 through the gas inlet port 660. Through a combination of the spacing and the pressure of gas, the passive electrode arc protector 410 can be selectively adjusted for a switching voltage between the "normal" and laser arc voltages illustrated in FIGS. 3(c) and 3(e).

The switching voltage of the passive arc protector 410 can be adjusted by starting with a small gap and a constant pressure gas. Then, the controller 355 can begin to trigger the x-ray generator 340 and the pulse forming network 370 to provide preionization of the high pressure gas and apply the ramping laser head voltage across the electrodes 320 and 330. With the small gap at the constant pressure in the passive electrode arc protector 410, the charge stored in the internal capacitance of the pulse forming network 370 will always discharge through the passive electrode arc protector 410, so that discharge between the laser electrodes 320 and 330 and lasing will not occur. Next, the spacing between the discharge contacts 620 and 630 should be increased by the screw adjustment mechanism 640 until the discharge between the laser electrodes 320 and 330 and lasing occurs. At such a spacing between the discharge contacts 620 and 630, the switching voltage of the passive electrode arc protector 410 will be set at a voltage between the "normal" breakdown voltage and the laser arc voltage.

The present invention can thus be adjusted without the need for a fault actually occurring. Furthermore, when different gases are used to fill the laser chamber 310 or other parameters are altered during experiments using the laser, protection by the passive electrode arc protector 410 can be easily maintained using this simple procedure for readjustment of the gap between the discharge contacts 620 and 630 to a voltage between the "normal" breakdown voltage and the laser head voltage.

Because the passive electrode arc protector 410 depends upon the difference in voltages reached at the laser head electrodes 320 and 330 when the preionization is correct or incorrect, as discussed above, the simplest location is at the laser head, connected across electrodes 320 and 330, as shown in FIG. 2. It is also necessary that the impedance between the laser head electrodes 320 and 330 and the arc protector 410 be sufficiently low that the discharge energy can be dissipated fast enough to keep the voltage at the laser head electrodes 320 and 330 from increasing once the arc protector 410 has fired. However, depending on the specific circuit, it may be possible to locate the arc protector 410 elsewhere in the circuit as long as there is a corresponding difference in voltages at that location between the situation of preionized breakdown at the laser head electrodes and non-preionized (arc) breakdown. Furthermore, the impedances must be such that the voltage at the laser head electrodes is prevented from reaching the arc breakdown value once the arc protector 410 has fired. It may be possible to locate the arc protector 410 across the transmission line elements 425 and 440 in FIG. 2.

Figure 5:
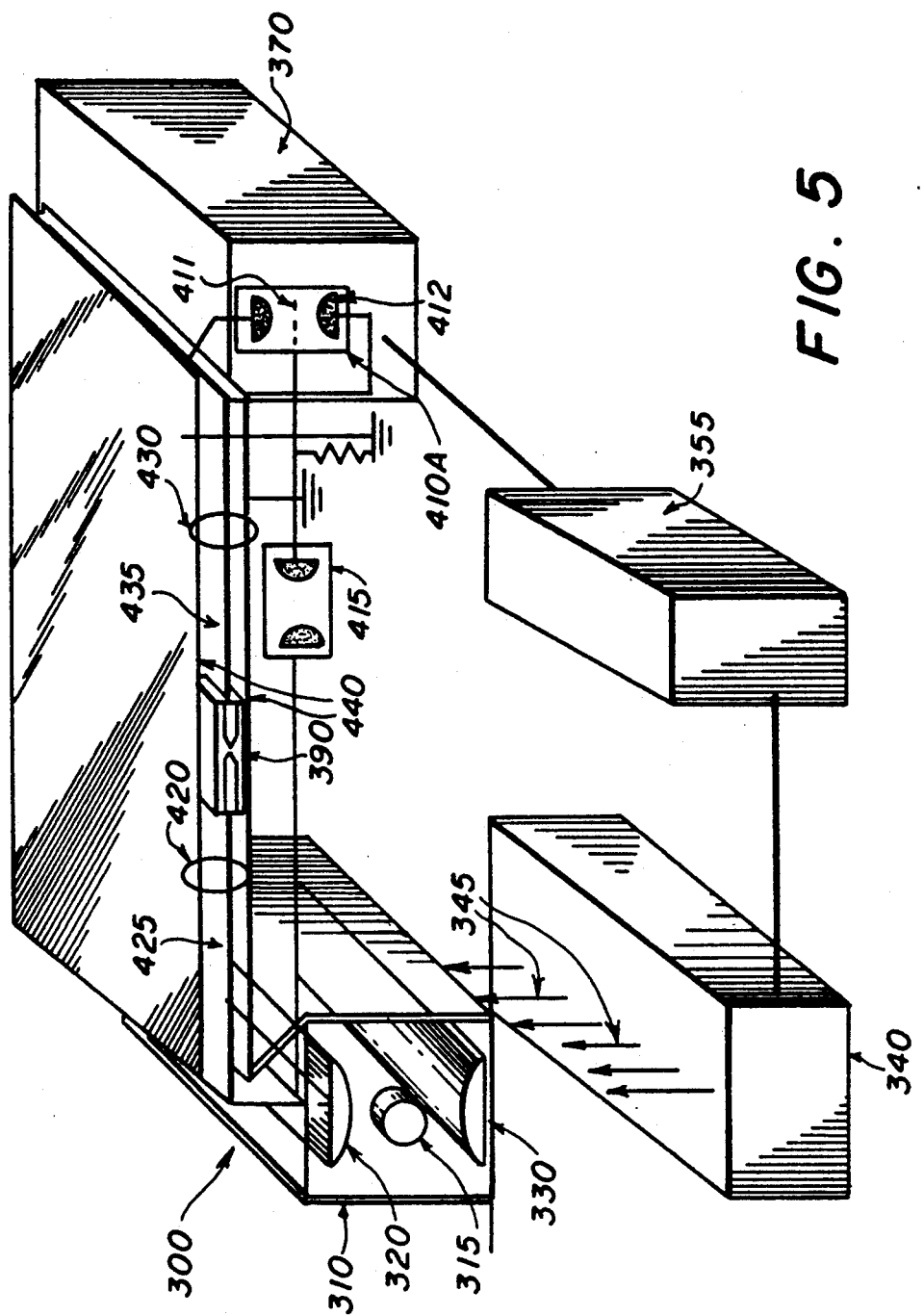
FIG. 5 illustrates a perspective schematic diagram of a second embodiment of the present invention.

Referring now to FIG. 5, a second embodiment of the invention is shown. Reference symbol numbers in FIG. 5 having the same or similar reference symbol numbers as those shown in FIG. 2 are similar in structure and function to those shown in FIG. 2 and, therefore, require no further description.

As shown in the embodiment of FIG. 5, it may also be possible to locate the arc protector across transmission elements 435 and 440 or even at the PFN 370 as shown in FIG. 5. In these cases, the arc protector 410 may consist of a triggered switch 410A in FIG. 5 where the trigger voltage is supplied from the laser head voltage across the electrodes 320 and 330 or from an auxiliary gap or switch 415 at the laser electrodes 320 and 330. Note that the arc protection switch 410 in FIG. 2 becomes a triggered switch 410A in FIG. 5 when it is repositioned and connected across the pulse forming network 370.

An additional element 415 may be needed to properly connect the trigger electrode 412 and ground electrode 411 of switch 410A to the laser electrodes 320 and 330. It may also be possible to connect elements 412 and 411 of 410A directly to the laser electrodes 320 and 330. When the invention is located as shown in FIG. 5, but with a direct connection from element 412 to laser electrode 320, the trigger gap between 412 and 411 is adjusted to break down only when the voltage at the laser electrodes 320 and 330 exceeds the usual laser breakdown voltage. If an auxiliary gap 415 is used, that gap is so adjusted, and the resulting voltage at the arc protection gap trigger electrode 412 when switch 415 fires causes the arc protection switch 410 to conduct and discharge the PFN 370.

When the arc protector 410A is located as shown in FIG. 5, the arc protector 410A drains the energy from the PFN 370, while the trigger portion, ground electrode 411 and trigger electrode 412 of the triggered switch 410A, with or without the auxiliary switch 415, must remove the energy from the transmission line to prevent an increase of the voltage at the laser electrodes 320 and 330 to the value necessary for damaging arc breakdown.

FIG. 5 therefore illustrates another embodiment of the invention in which the arc protection switch 410A is located at the PFN 370, and the trigger voltage for that switch is derived from the voltage across the laser head electrodes 320 and 330 directly, or by means of an auxiliary switch 415 which triggers the arc protection switch 410A. The auxiliary switch 415A is adjusted to only fire when the voltage at the laser head electrodes 320 and 330 exceeds the preionized breakdown value. The embodiment of 5 is still "automatic" and passive in that operation derives directly from the laser head voltage.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

What is claimed is:

1. A pulse discharge laser, comprising:
    a preionizer generator to intermittently produce preionization energy;
    a laser chamber enclosing a high pressure gas capable of preionization in response to the preionization energy;
    a pair of laser electrodes disposed within said laser chamber;
    a pulse forming network operatively connected to said pair of laser electrodes to intermittently supply a ramping voltage thereto; and
    an electrode arc protector operatively connected to receive the ramping voltage for protecting the pulse discharge laser from damage by discharging itself if said preionizer generator fails to produce proper preionization energy in said laser chamber.

2. The pulse discharge laser of claim 1 wherein:
    said electrode arc protector is capable of a voltage setting sufficient to discharge the ramping voltage if the ramping voltage reaches a fault condition due to lack of preionization of the high pressure gas in said laser chamber.

3. The pulse discharge laser of claim 2 wherein:
    said electrode arc protector comprises a pair of opposingly spaced discharge contacts.

4. The pulse discharge laser of claim 3 wherein:
    said pair of opposingly spaced discharge contacts have an adjustable space between said discharge contacts capable of adjustment of a switching voltage at which the ramping voltage would discharge if it reached said fault condition.

5. The pulse discharge laser of claim 4 wherein:
    said pair of discharge contacts comprises an adjustment mechanism adjustably connected to said pair of discharge contacts to adjust the space between said discharge contacts.

6. The pulse discharge laser of claim 3 wherein:
    said opposingly spaced pair of discharge contacts are surrounded by a gas; and
    said laser further includes a pressure regulator to regulate a pressure of the gas to provide adjustment of a switching voltage at which the ramping voltage would discharge if it reached said fault condition.

7. The pulse discharge laser of claim 1 wherein said pulse forming network includes:
    a capacitance to store a charge;
    a power supply operatively connected to said capacitance to provide the charge; and a switch operatively connected between said capacitance and said pair of electrodes.

8. The pulse discharge laser of claim 7 wherein:
said capacitance comprises a water line.

9. The pulse discharge laser of claim 7 wherein:
said switch comprises a rail gap switch.

10. The pulse discharge laser of claim 7 wherein:
said switch comprises a magnetic switch.

11. The pulse discharge laser of claim 1 wherein:
said preionizer generator generates a preionization energy comprised of ultraviolet energy.

12. The pulse discharge laser of claim 1 wherein:
said preionizer generator generates a preionization energy comprised of x-ray energy.

13. The pulse discharge laser of claim 1 wherein:
said preionizer generator generates a preionization energy comprised of an electron beam.

14. The pulse discharge laser of claim 1 wherein:
said pulse discharge laser is an excimer laser and the high pressure gas enclosed by said laser chamber comprises a gas mixture to create an excimer selected from the group consisting of XeCl, XeF, KrF and ArF.

15. The pulse discharge laser of claim 2 wherein:
said electrode arc protector comprises a pair of opposingly spaced discharge contacts connected in parallel with said laser electrodes.

16. The pulse discharge laser of claim 15 wherein:
said pair of opposingly spaced discharge contacts are adjustable discharge contacts, said adjustable discharge contacts being adjustable to a voltage setting higher than the voltage at which said laser electrodes normally discharge in the presence of a proper amount of preionization energy in said laser chamber and lower than the voltage at which said laser electrodes would discharge in the absence of a proper amount of preionization energy in said laser chamber in order to prevent discharge from occurring between said laser electrodes in the abscence of the proper amount of preionization energy in said laser chamber.

* * * * *